Patented July 4, 1939

2,164,783

UNITED STATES PATENT OFFICE 2,164,783

LEUCO SULPHURIC ACID ESTERS OF ANTHRAQUINONE SELENAZOLES

Milton A. Prahl, Milwaukee, Wis., assignor to E. I. du Pont de Nemours & Company, Wilmington, Del., a corporation of Delaware No Drawing. Application August 23, 1937, Serial No. 160,475

2 Claims. (Cl. 260—298)

This invention relates to the preparation of new sulphuric acid ester salts of leuco vat dyestuffs of the anthraquinone selenazole series.

A number of dyestuffs of the vat dye class have been rendered water soluble by converting them to their sulphuric acid esters with varying degrees of success. Many of the dyes of the anthraquinone vat dyestuff field, however, are not converted to water soluble compounds by the known methods and some when converted to the leuco sulphuric acid esters are so soluble that they cannot be isolated in a form satisfactory for use. An attempt has been made to find a greenish yellow vat dyestuff of the anthraquinone field that can be converted to a soluble sulphuric acid ester which will be suitable for dyeing by the general methods now employed in the dyeing of this class of colors. The greenish yellow vat dyestuffs now on the market do not give satisfactory solubilized colors when subjected to the known methods for forming the leuco sulphuric acid esters, and hence considerable work has been done in an attempt to find greenish yellow vat dyestuffs that will give a water soluble leuco sulphuric acid ester having good dyeing properties, and which when mixed with other colors retain their brightness and coloring power.

It is therefore an object of this invention to prepare a new greenish yellow printing and padding color of the anthraquinone selenazole leuco sulphuric ester type which possesses outstanding brightness, printing strength, and fastness properties.

It is a further object of the invention to prepare water soluble colors of this type which may be applied to fibers in combination with the sulphuric acid ester salt of leuco dimethoxydibenzanthrone to produce bright shades of yellow-green with fastness properties and strength comparable to the dyes obtained from the leuco ester of dimethoxydibenzanthrone.

I have found that the anthraquinone selenazole of the general formula

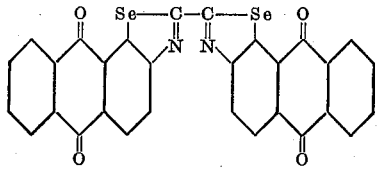

(as more particularly described in United States Patent 1,983,562) can be converted to the leuco sulphuric acid ester salt by the general methods employed for the preparation of this class of esters, such as by reacting it with pyridine-sulphur-trioxide (which may be prepared by reacting sulphur-trioxide, oleum, or chlorosulphonic acid with pyridine) and in an anhydrous medium such as pyridine with a metal (such as copper or zinc), with subsequent conversion of the product in the solution to the salt by treating with an alkali-metal hydroxide or other alkali such as triethanolamine. The compound is isolated from the alkaline mass by filtering off the cuprous oxide and unreacted anthraquinone selenazole, with subsequent distillation of the pyridine and salting out of the soluble color from the remaining concentrated solution.

The product is then filtered off as a paste and may be used as such, or the solution may be evaporated under reduced pressure to give a dry powder. The product is very stable when maintained in a slightly alkaline condition.

The following example is given to illustrate the invention more fully. The parts used are by weight.

Example

To 1000 parts of anhydrous pyridine there are added, with thorough stirring, during 3 hours, 250 parts of 65% oleum, at a temperature of 40 to 60° C. 100 parts of C,C'-di(anthraquinone-1,2-selenazole) (prepared and purified, for instance, as outlined in Example 4 of United States Patent 1,983,562, and preferably further purified by dissolving in 100% sulphuric acid and slow precipitation by dilution of the acid to 80% by addition of water), of seleniun content of 21–22%, are added.

The suspension is heated to 50–55° C. and 80 parts of copper powder are slowly added during 1½ hours. The mass is then stirred at this temperature 2½ hours longer, and then poured into a slurry of about 6000 to 8000 parts of ice and water, with slow agitation. The heavy copper dyestuff complex separates out and forms a lower layer in the water. After settling for ½ to 1 hour, the supernatant aqueous layer is siphoned off, and, to the tarry complex remaining, a solution of 50 parts of sodium hydroxide in 500 parts of water is added. The mass is stirred until no more tarry complex is present.

The suspension is filtered to remove cuprous oxide, and the clear filtrate is vacuum distilled at 35–40° C. until all pyridine has been removed.

The filtrate is re-filtered to remove any sludge and the soluble leuco ester is salted out with 15% of its weight of potassium carbonate. The dyestuff precipitates in crystalline form. It is filtered off, washed with 15% potassium carbonate solution, and preserved as a paste; or the paste may be evaporated, in vacuum, to dryness to yield a powder.

The product thus obtained is a reddish or yellowish brown crystalline paste (depending upon the size of crystals obtained) or a brown powder. It is very soluble in water, yielding a brown solution which may be padded or printed on cotton, wool or silk, giving brownish shades which on treatment with oxidizing agents in the presence of an acid are regenerated on the fiber to the brilliant greenish yellow shade of the parent vat color. Since this sulphuric acid ester is substantive to silk and wool (similar to an acid wool dyestuff) somewhat more strenuous oxidizing conditions are required to regenerate the original color on these fibers than is required for development on cellulose fiber.

The new ester may be printed on cellulose fibers, using the usual known formulas for printing of leuco sulphuric acid esters of vat dyestuffs. The bright yellow prints thus obtained possess remarkable fastness and exhibit excellent penetration. The tinctorial strength of the new ester when printed is approximately 100% greater than the parent vat color printed by the vat method.

The new ester may be applied in admixture with the leuco sulphuric acid ester of dimethoxydibenzanthrone to give brilliant yellowish green shades which exhibit remarkable fastness to light, chlorine, and washing, and which are superior to the yellowish green shades now available in this class of dyestuffs.

The ester may also be padded on the fiber, either as a self color or in admixture with the leuco ester of dimethoxydibenzanthrone or other leuco sulphuric acid esters, and developed by the usual methods.

Modifications in the process may of course be made by those skilled in the art, such as the replacement of the pyridine by other tertiary amine bases and the substitution of other metals such as zinc for the copper employed in the example. Other strong bases such as potassium hydroxide, triethanolamine, etc., may be substituted for the sodium hydroxide, to give the corresponding salts of the leuco sulphuric acid ester.

I claim:

1. The water soluble leuco sulphuric acid ester salt of C,C'-di(anthraquinone-1,2-selenazole) obtainable by acting on C,C'-di(anthraquinone-1,2-selenazole) with sulphur-trioxide in the presence of pyridine and copper, with subsequent treatment of the resulting product with an alkali in water.

2. Fiber colored by developing thereon a color comprising a leuco sulphuric acid ester salt of C,C'-di(anthraquinone-1,2-selenazole).

MILTON A. PRAHL.